United States Patent [19]
Yokozeki et al.

[11] Patent Number: 6,100,650
[45] Date of Patent: Aug. 8, 2000

[54] ELECTRODELESS DISCHARGE LAMP UNIT

[75] Inventors: Ichiro Yokozeki; Kozo Uemura, both of Kanagawa-ken, Japan

[73] Assignee: Toshiba Lighting & Technology Corp., Tokyo, Japan

[21] Appl. No.: 09/281,091

[22] Filed: Mar. 30, 1999

[30] Foreign Application Priority Data

Mar. 30, 1998 [JP] Japan .................................. 10-084735

[51] Int. Cl.[7] ............................ H05B 41/16; H05B 41/24
[52] U.S. Cl. ............................. 315/248; 315/344; 315/39
[58] Field of Search .................................... 315/246, 248, 315/224, 344, 39, 267

[56] References Cited

U.S. PATENT DOCUMENTS

| 5,047,692 | 9/1991 | Borowiec et al. ...................... 315/248 |
| 5,059,868 | 10/1991 | El-Hamamsy et al. ................. 315/248 |
| 5,095,249 | 3/1992 | Roberts et al. .......................... 315/248 |
| 5,107,185 | 4/1992 | El-Hamamsy et al. ................. 315/248 |
| 5,140,227 | 8/1992 | Dakin et al. ............................ 315/248 |

*Primary Examiner*—Don Wong
*Assistant Examiner*—Wilson Lee
*Attorney, Agent, or Firm*—Pillsbury Madison & Sutro LLP

[57] ABSTRACT

An electrodeless discharge lamp unit includes an electrodeless discharge lamp that has a luminescent tube with an excitation coil wound round and an auxiliary tube, a high-tension applying circuit to apply pulse voltage of a peak value that is able to dielectric break the discharge space in the luminescent tube and a current injection circuit to apply voltage, that is able to maintain non-ring shaped discharge formed in the luminescent tube by applying pulse voltage by a high-tension applying circuit even when the application of pulse voltage is suspended, to the end of the auxiliary tube.

16 Claims, 9 Drawing Sheets

ELECTRODELESS DISCHARGE LAMP UNIT

BACKGROUND OF THE INVENTION

1. Field of the Invention

The present invention relates to an electrodeless discharge lamp unit that lights an electrodeless discharge lamp with an excitation coil wound round it by supplying high frequency electric power to the excitation coil and a lighting system and, more particularly, to an electrodeless discharge lamp unit that lights an electrodeless discharge lamp that is provided with an auxiliary tube.

2. Description of the Related Art

As related art of electrodeless discharge lamp units, those units disclosed in the following Japanese Patents are known:

(1) Japanese Patent Disclosure No. 8-329904
(2) Japanese Patent Disclosure No. 9-92013
(3) Japanese Patent No. 2548867 and
(4) Japanese Patent Disclosure No. 7-22184

In Related Art (1), a technology to form a ring-shaped discharge in a luminescent tube was disclosed; that is, a heat resisting metallic fine conductor is kept in contact with the outer wall of a luminescent tube. After dielectric breaking a luminescent tube by applying high-tension to this metallic fine conductor, high-frequency current is applied to an excitation coil wound round the luminance tube so that a ring-shaped discharge is formed in the luminescent tube.

In Related Art (2), the bulb is in the double structure and a fine tube is formed in the outer bulb and the bottom of this fine tube is kept in contact with the outer wall surface of the inner bulb. Also, an electric starting conductor is arranged in the fine tube. This Related Art (2) can be said the technology developed from Related Art (1).

In Related Art (3), auxiliary current is injected into the luminescent tube through the partition wall between the auxiliary tube and the luminescent tube. In this Related Art (3), the technology to improve the starting ability by injecting auxiliary current was disclosed. Further, a ring-shaped discharge is formed in the luminescent tube by applying current to the excitation coil when forming auxiliary discharge.

Related Art (4) disclosed a method to surely obtain required auxiliary tube apply voltage and excitation coil current in the construction wherein the auxiliary tube is kept airtight separately from the luminescent tube airtight likewise Related Art (3).

However, in Related Art (1) and (2), the electrodeless discharge lamp unit is in a structure that a metallic conductor is kept in contact with the luminescent tube and so, the coldest portion is formed at its contact point. Therefore, it is difficult to obtain luminescent metallic steam pressure required for high efficient discharge. In addition, as the frequency heat cycle of lighting ON/OFF is applied to the metallic conductor and the tube wall of the luminescent tube, the tube wall of the luminescent tube can be cracked.

In Related Art (3) and (4), as the discharge lamp unit is in such a structure that the metallic conductor was not kept in contact with the luminescent tube, the above-mentioned problems are not generated or even when generated, its extent is less. However, the ring-shaped discharge is formed in the luminescent tube by forming auxiliary discharge in the auxiliary tube, only a luminescent tube of lower gas pressure than those disclosed in Related Art (1) and (2) can be started. In particular, even when the high-tension generating means disclosed in Related Art (1) and (2) was connected directly to the end of the auxiliary tube as disclosed in Related Art (4), starting ability of the lamp was not promoted at all.

SUMMARY OF THE INVENTION

It is an object of the present invention to provide an electrodeless discharge lamp unit that is able to promote its starting ability.

The present invention provides an electrodeless discharge lamp unit comprising: an electrodeless discharge lamp provided with a luminescent tube with an excitation coil wound round it and an auxiliary tube; high-tension applying means for applying pulse voltage of a peak value that is able to dielectric break the discharge space in the luminescent tube to the end of the auxiliary tube; and current injection means for applying voltage, that is able to maintain the non-ring shaped discharge formed in the luminescent tube by applying pulse voltage by the high-tension applying means even when the application of pulse voltage is suspended, to the end of the auxiliary tube.

Further, the present invention provides an electrodeless discharge lamp unit comprising: an electrodeless discharge lamp having an airtight luminescent tube and an auxiliary tune; an excitation coil wound round the luminescent tube; a source of high-frequency current to supply high-frequency current to the excitation coil; and high-tension applying means for applying pulse voltage that is able to dielectric break the discharge space in the luminescent tube via the auxiliary tube without supplying high-tension current from the source of high-frequency current to the excitation coil to the auxiliary tube.

DETAILED DESCRIPTION OF THE PREFERRED EMBODIMENTS

Hereinafter, preferred embodiments of the present invention will be described referring to the attached drawings.

Figure 1:
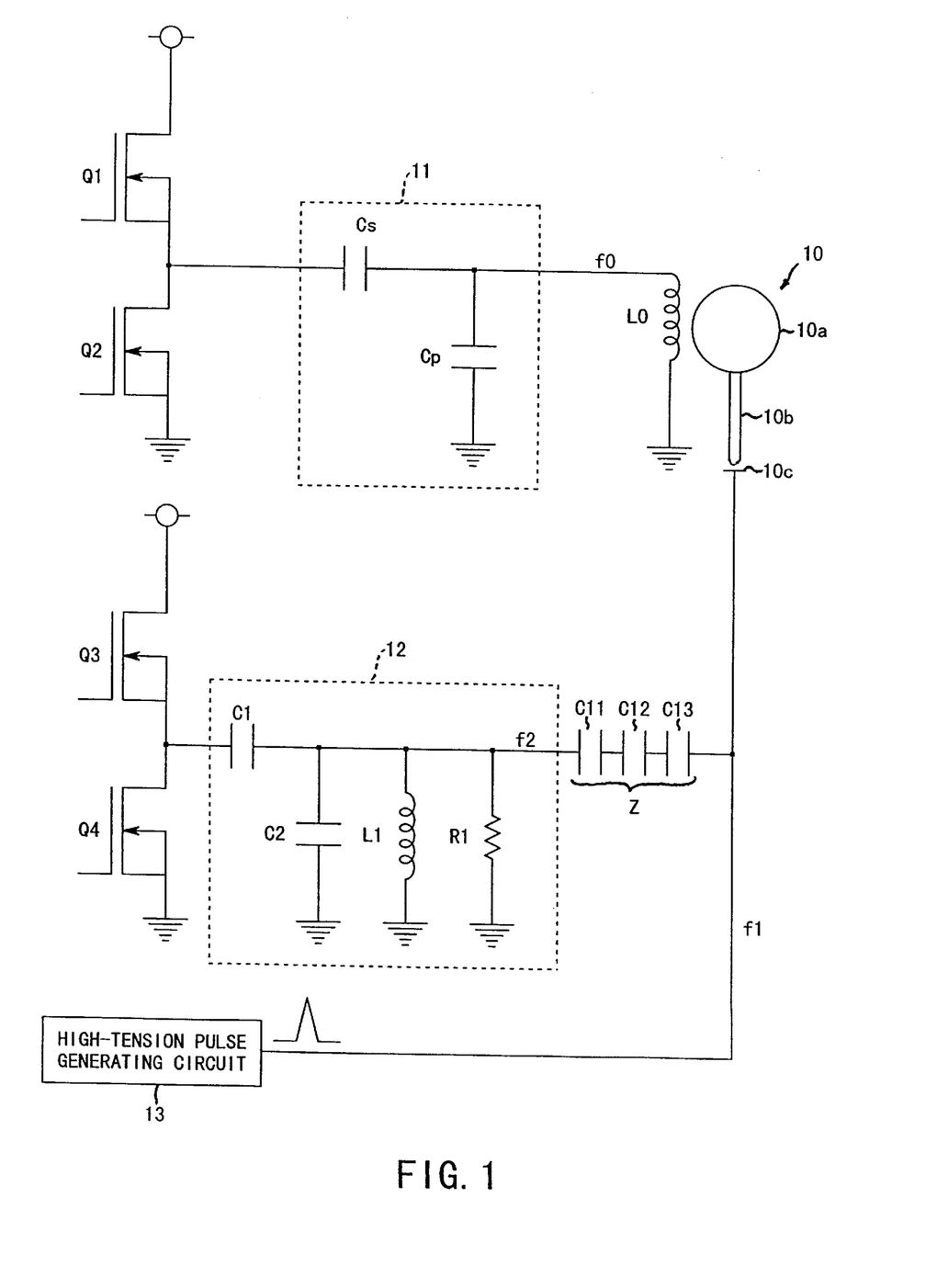
FIG. 1 is a circuit diagram showing one embodiment of an electrodeless discharge lamp unit of the present invention.

FIG. 1 is a circuit diagram showing an embodiment of an electrodeless discharge lamp unit of the present invention.

An electrodeless discharge lamp 10 shown in FIG. 1 comprises an luminescent tube 10a and an auxiliary tube (a small tube for starting) 10b that are made airtight separately.

The tube wall of the electrodeless discharge lamp 10 is formed by, for instance, quartz, alumina, YAG (Yttrium Aluminum Garnet), etc. The luminescent tube 10a is filled with discharge gas such as metallic, halogen, buffer gas, etc. Buffer gas is filled at, for instance, 5–80 kpa. The auxiliary tube 10b is filled with rare gas.

The luminescent tube is wound round with an excitation coil L0 and the auxiliary tube 10b is provided with an external electrode 10c. Supply voltage is applied to the drain of a transistor Q1, that is a MOS-FET, and the source of the transistor Q1 is connected to the drain of a transistor Q2. Switching pulse of frequency f0 is applied to the gates of the transistors Q1 and Q2.

The connecting point between the source of the transistor Q1 and the drain of the transistor Q2 is connected to one end of a series capacitor Cs. The other end of the series capacitor Cs is connected to one end of each of a parallel capacitor Cp and the excitation coil L0. The other end of each of the parallel capacitor Cp and the excitation coil L0 are grounded. The series capacitor Cs and the parallel capacitor Cp comprise a matching circuit 11 that is for efficiently transmitting high frequency power of f0 that is generated by the transistors Q1 and Q2 to the excitation coil L0 and the luminescent tube 10a, that are loads.

Supply voltage is applied to the drain of a transistor Q3, that is a MOS-FET, and the source of the transistor Q3 is connected to the drain of a transistor Q4. The source of the transistor Q4 is grounded. Switching pulse of frequency f2 is applied to the gates of the transistors Q3 and Q4. The connecting point between the source of the transistor Q3 and the drain of the transistor Q4 is connected to one end of a series capacitor C1. The other end of the series capacitor C1 is connected to one end of each of a parallel capacitor C2, a parallel inductance L1, a damping resistor R1 and a capacitor C11. The other ends of the parallel capacitor C2, parallel inductance L1 and damping resistor R1 are grounded.

The parallel capacitor C2, the parallel inductance L1 and the damping resistor R1 comprise a current injection circuit 12. The other end of the capacitor C11 is connected to the external electrode 10c via the series capacitors C12 and C13, and these capacitors C11–C13 comprise an interference blocking impedance Z(f2). The interference blocking impedance refers to an impedance element that has a large impedance sufficiently enough against high-tension frequency f1. High-tension pulse of frequency f1 is further applied to the external electrode 10c from a high-tension pulse generating circuit 13.

Next, test results will be explained. First, as a sample of the electrodeless discharge lamp 10 shown in FIG. 1, the auxiliary tube 10b is filled with rare gas of xenon (Xe) at 20 Torr. Further, the starting of the luminescent tube 10a was checked using an arc tub filled with a luminous material that adheres to the tube wall at a normal temperature and rare gas of Xe at 250 Torr. The dielectric breakdown voltage of the auxiliary tube 10b of this electrodeless discharge lamp 10 was about 1,300V and that of the luminescent tube 10a was about 2,500V. Further, when the luminescent tube 10a was dielectric broken, the ring-shaped discharge could be formed in the luminescent tube 10a when current at the excitation coil of 2 turns was 50 A.

Figure 2:
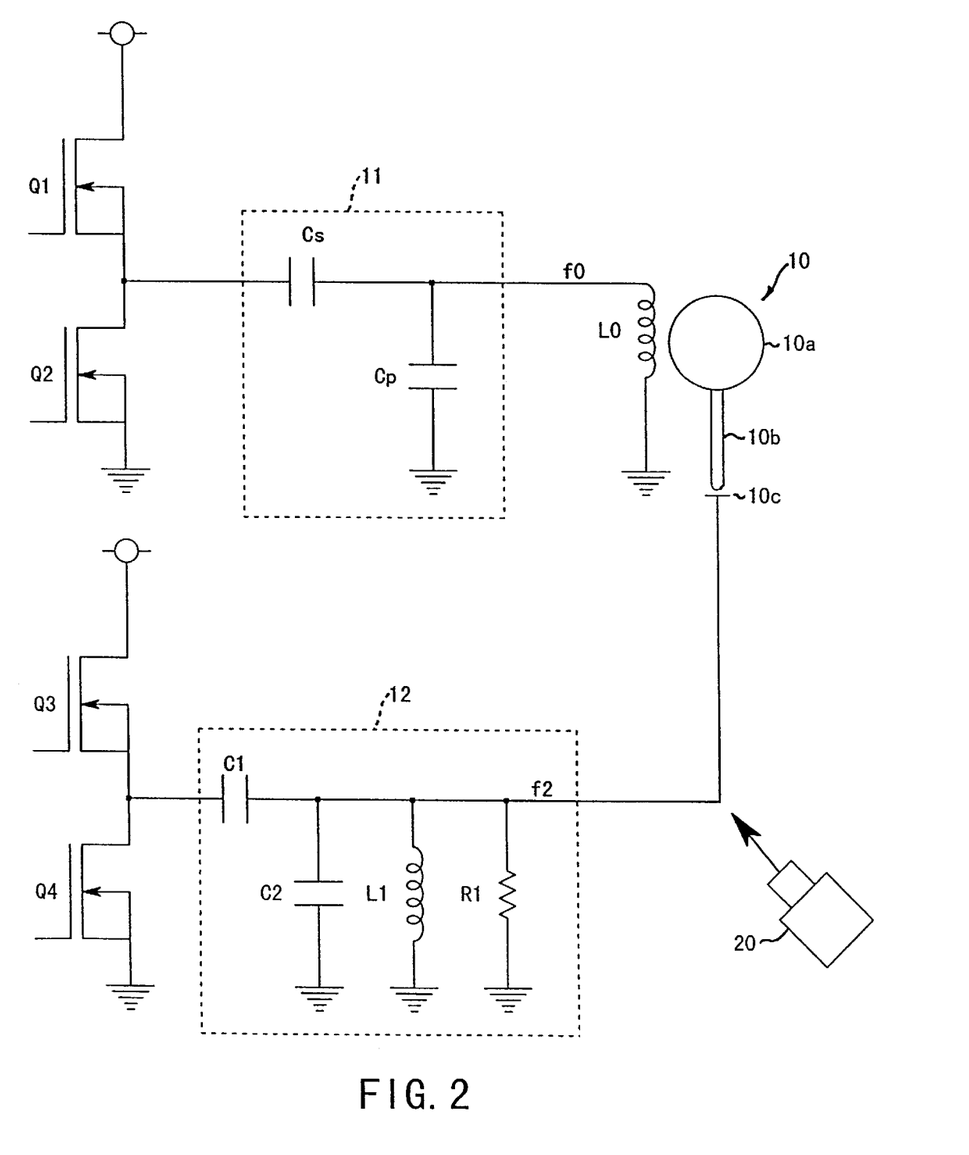
FIG. 2 is an explanatory diagram showing a test method of an electrodeless discharge lamp unit shown in FIG. 1.

Next, as shown in FIG. 2, in the circuit with the interference blocking impedance Z(f2) and the high-tension pulse generating circuit 13 removed from the circuit shown in FIG. 1, pulse voltage of frequency 150–300 kHz and a peak value 16 kV was applied to the end of the auxiliary tube 10b using an igniter 20. The igniter 20 generates continuous pulse voltage of about 100 kV. At this time, values of the series capacitor Cs and the parallel capacitor Cp comprising the matching circuit 11 were pre-adjusted and 50 A current was applied to the excitation coil L0. As a result, the auxiliary tube 10b could not be dielectric broken and further, as a matter of course, the ring-shaped discharge could not be formed in the luminescent tube 10a.

Figure 3:
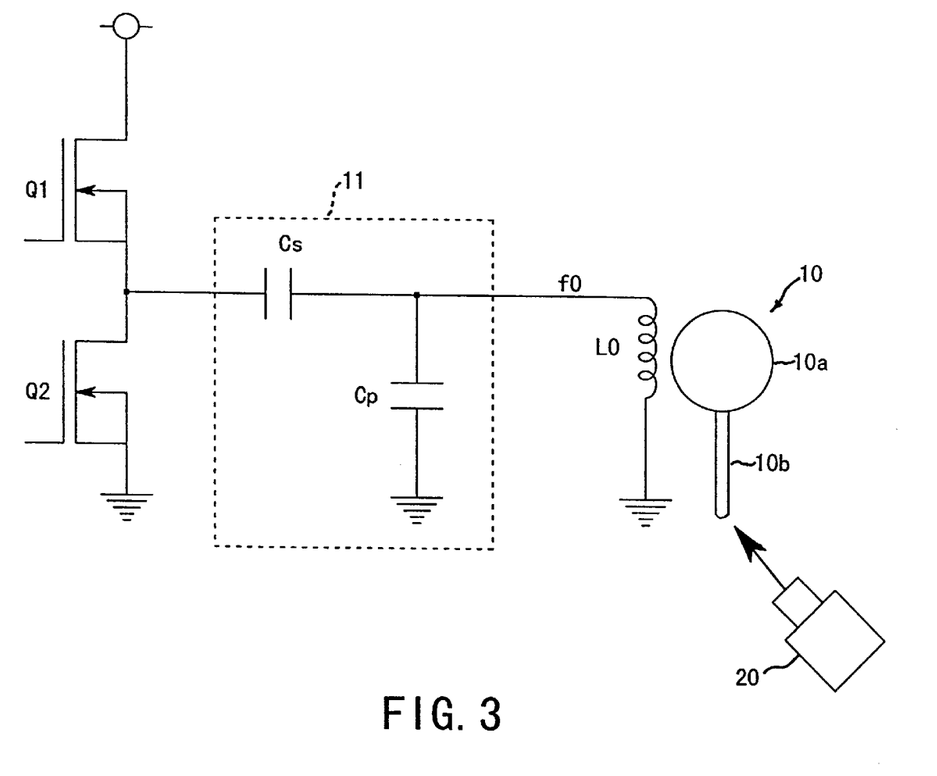
FIG. 3 is an explanatory diagram showing another test method of an electrodeless discharge lamp unit shown in FIG. 1.

Then, as shown in FIG. 3, in the circuit with the current injection circuit 12 further removed from the circuit shown in FIG. 2, pulse voltage was applied to the end of the auxiliary tube 10b using the igniter 20. As a result, the ring-shaped discharge could be formed when the driving current of the excitation coil L0 was 50 A. However, when the driving current of the excitation coil L0 was 45 A, no ring-shaped discharge could be formed.

Figure 4:
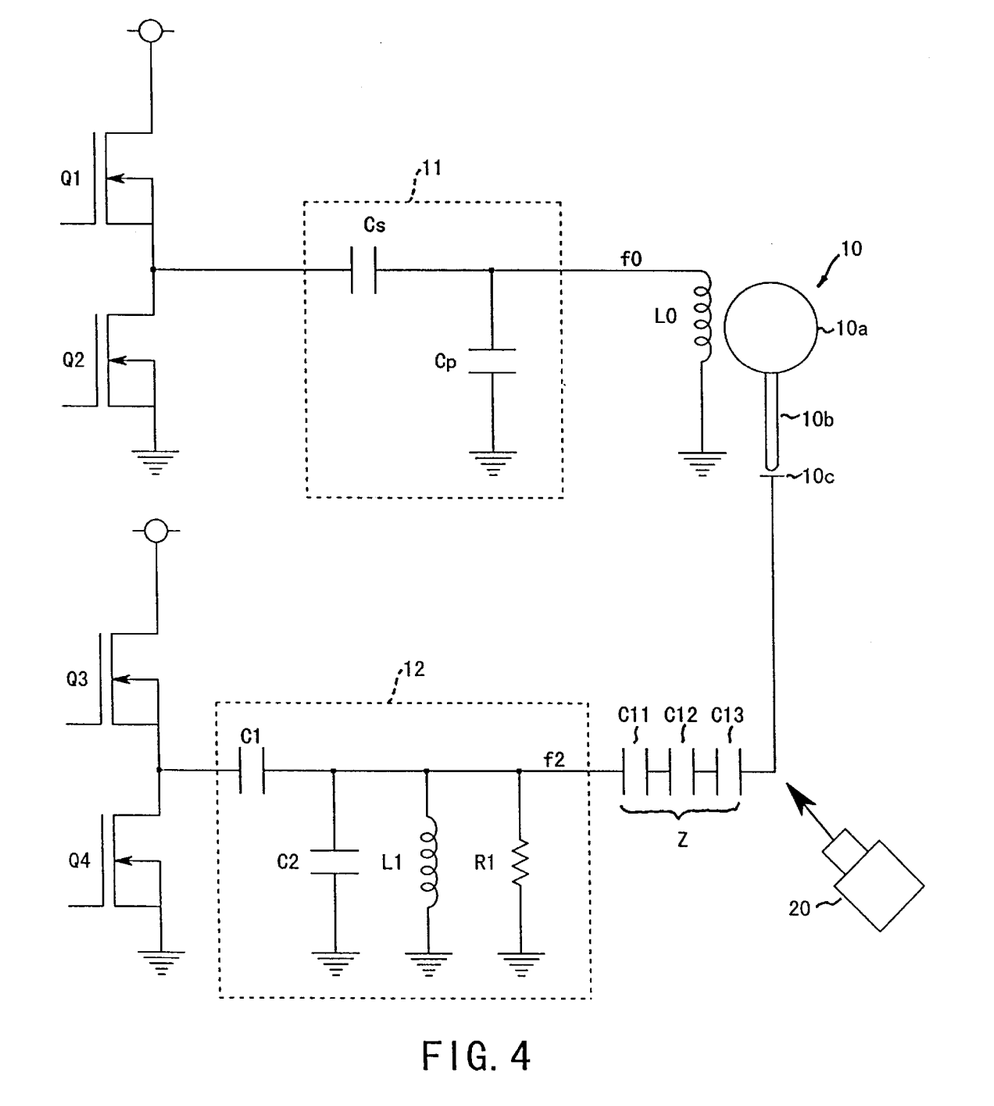
FIG. 4 is an explanatory diagram further showing another test method of an electrodeless discharge lamp unit shown in FIG. 1.

Then, as shown in FIG. 4, in the circuit shown in FIG. 1, pulse voltage was applied to the end of the auxiliary tube 10b using the igniter 20. As a result, when the interference blocking impedance Z(f2) was set at 30 pF, the ring-shaped discharge could be formed at the excitation coil L0 driving current of about 42 A. However, when the interference blocking impedance Z(f2) was set at 50 pF, the luminescent tube 10a could not be dielectric broken. Further, even when the driving current of the excitation coil L0 was set at 50 A, no ring-shaped discharge could be formed.

Figure 5:
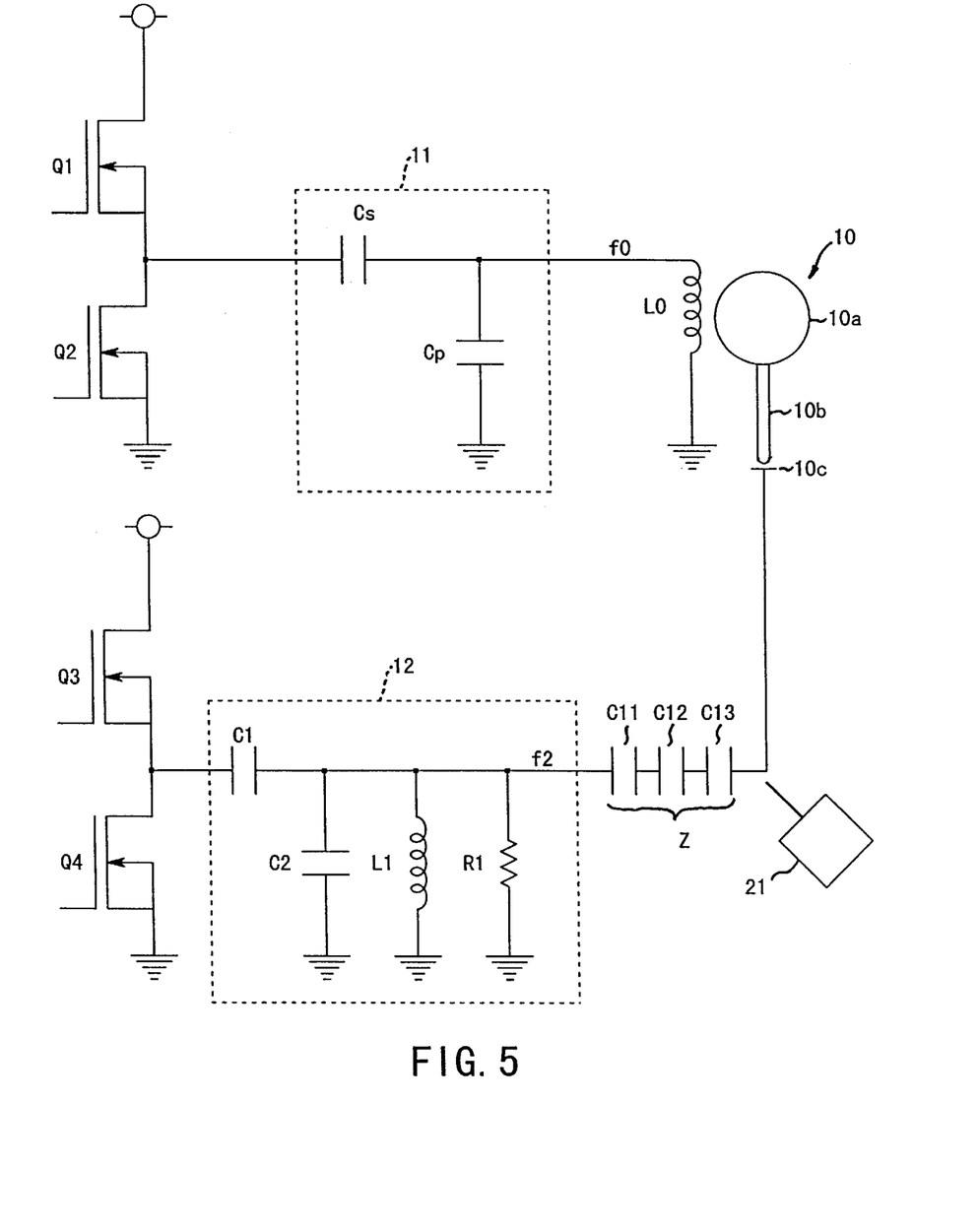
FIG. 5 is an explanatory diagram further showing another test method of an electrodeless discharge lamp unit shown in FIG. 1.

Then, as shown in FIG. 5, in the circuit shown in FIG. 1, pulse voltage of peak value 7 kV was applied to the end of the auxiliary tube 10b using an igniter 21 that generates single pulse voltage of about 30 kV that is used for normal discharge lamps. As a result, even when the driving current of the excitation coil L0 was set at 50 A, no ring-shaped discharge could be formed.

The test results shown above are summarized as follows:

1. To dielectric breakdown the luminescent tube 10a by applying pulse voltage to the end of the auxiliary tube 10b, a source of pulse of peak value above a specified value.

2. The ring-shaped discharge could be formed at less excitation coil current by applying high-frequency current of about 10 MHz from the auxiliary tube 10b rather than by bringing fine discharge in the luminescent tube 10a to the ring-shaped discharge by only the source of pulse.

3. Here, when the injection current to the auxiliary tube 10b was changed, it was observed that this injection current acts as if it is a back-up power source.

4. Even when a distance between the excitation coil L0 and the luminescent tube 10a changed slightly, a peak value of pulse voltage for dielectric breakdown is not much strongly affected.

Therefore, according to the test results shown above, pulse voltage of a peak value Vp that is able to dielectric breakdown is applied to the end of the auxiliary tube 10b from the high-tension pulse generating circuit 13. If a non-ring shaped discharge is formed in the luminescent tube 10a by this pulse voltage, it is only necessary to apply voltage Vst that is able to maintain the non-ring shaped discharge in the auxiliary tube 10b even if it is suspended to apply this pulse voltage to the end of the auxiliary tube 10b from the current injection circuit 12 to the end of the auxiliary tube 10b from the current injection circuit 12.

In other words, using a dedicated high-tension pulse generating circuit 13, it is possible to apply pulse voltage of a high peak value to the end of the auxiliary tube 10b. As a result, it is possible to certainly execute the dielectric breakdown of the luminescent tube 10a. Further, regarding a backup power source required for starting a high-tension lamp, it is expected that only magnetic flux that is generated by the excitation coil is uncertain and insufficient. So, by providing the current injection circuit 12 separately, the energy required for glow arc transposition can be obtained certainly. Further, the ring-shaped discharge can be formed certainly with less excitation coil current.

Further, the end of the auxiliary tube 10b is connected between the interference blocking impedance Z(f2) and the high-tension pulse generating circuit 13 not between the interference blocking impedance Z(f2) and the current injection circuit 12. As a result, it is possible to apply high pulse voltage to the end of the auxiliary tube 10b certainly by reducing the influence of the current injection circuit 12 that has a low output impedance. Further, as there is large impedance Z between the current injection circuit 12 and the high-tension pulse generating circuit 13, it is possible to compose the circuit using component parts having not so high withstanding voltage. Here, the tube wall capacity of the lamp 10 used in the above-mentioned tests has impedance as relatively high as several pF. However, the interference blocking impedance Z(f2) that has a capacity small enough to assure withstanding voltage and current injection safety of component parts comprising the current injection circuit 12 and large enough to secure injection current of a certain level or above is selected.

Further, in case of such electrodeless discharge lamp unit, large design changes are actually required for a peak value of high-tension pulse, injection current to the auxiliary tube 10b, current to the excitation coil L0 etc. not only for the problems of withstanding voltage and current rating of circuits but also depending on the starting conditions of the lamp 10. For instance, current to the excitation coil L0 may be not so large according to the specification change and fluctuation of the luminescent tube 10a and the auxiliary tube 10b but dielectric breakdown voltage may or may not become necessary accordingly.

So, the relationship between the frequency f2 at the current injection circuit 12 and the interference blocking impedance Z(f2) side and the frequency f1 at the high-tension pulse generating circuit 13 side is made f1<f2. Further, as it becomes possible to apply high-tension to the end of the auxiliary tube 10b certainly without subject to the influence of the current injection circuit 12 when the relationship between the frequencies f1 and f2 is made to Z(f1)>Z(f2), the starting property can be improved.

Further, when the interference blocking impedance Z(f2) is selected so that the lamp can be started at the smallest excitation coil current, it is possible to obtain the most effective operating point for the fluctuated electrodeless discharge lamp 10.

Here, the damping resistor R1 is provided at the current injection circuit 12 side. However, as high voltage required for dielectric breakdown is obtained by providing the high-tension generating circuit 13 separately in the present invention, the damping resistor R1 can be operated more strongly and therefore, it is possible to improve the starting property.

Figure 6:
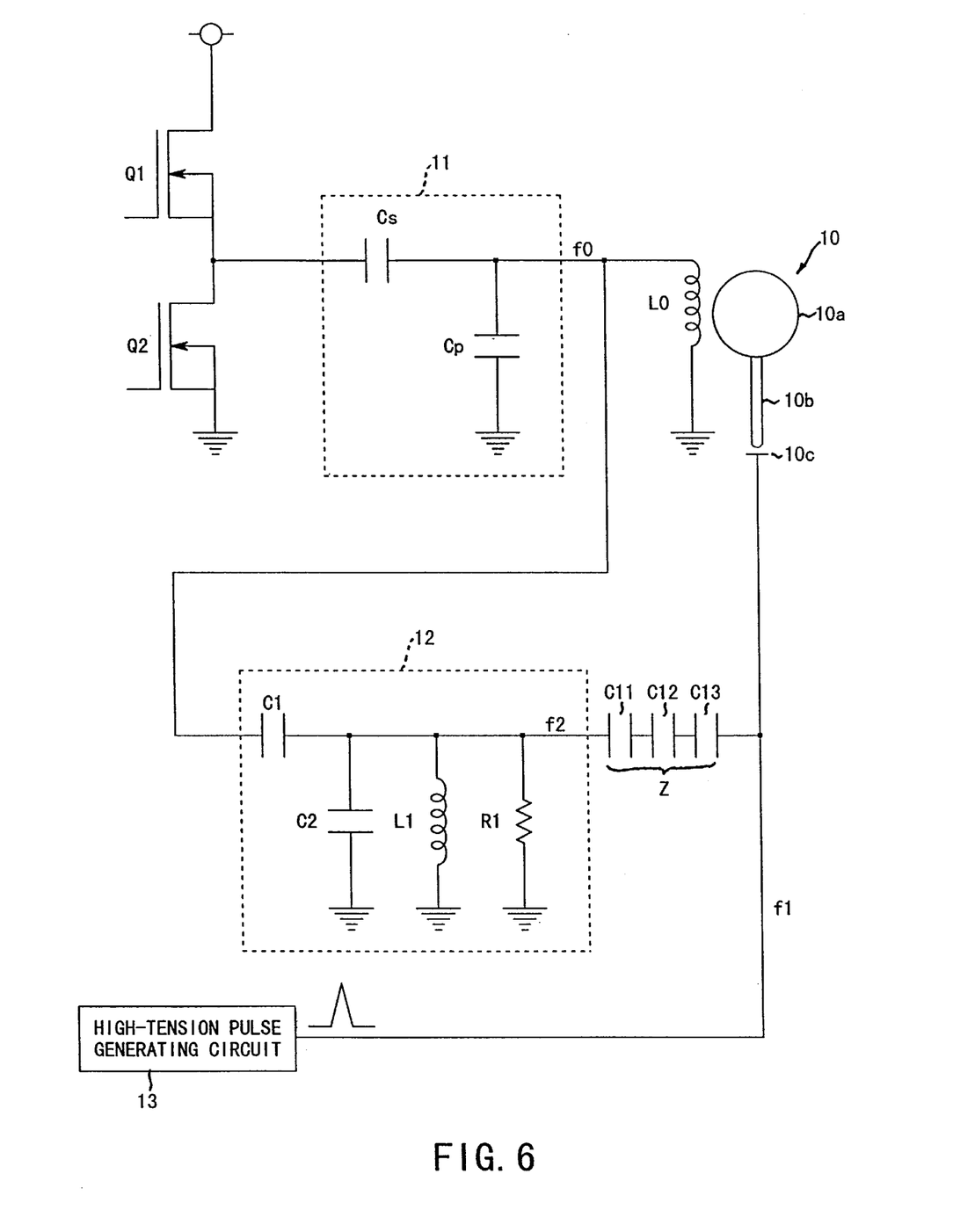
FIG. 6 is a circuit diagram showing an deformed example of an electrodeless discharge lamp unit shown in FIG. 1.

Further, the circuit shown in FIG. 1 is so composed that make the excitation coil L0 frequency f0 and the current injection circuit 12 side frequency f2 become different each other. However, the circuit may be so composed that f0 becomes equal to f2 (f0=f2) by making a high-frequency power source commonly usable as shown in FIG. 6.

Figure 7:
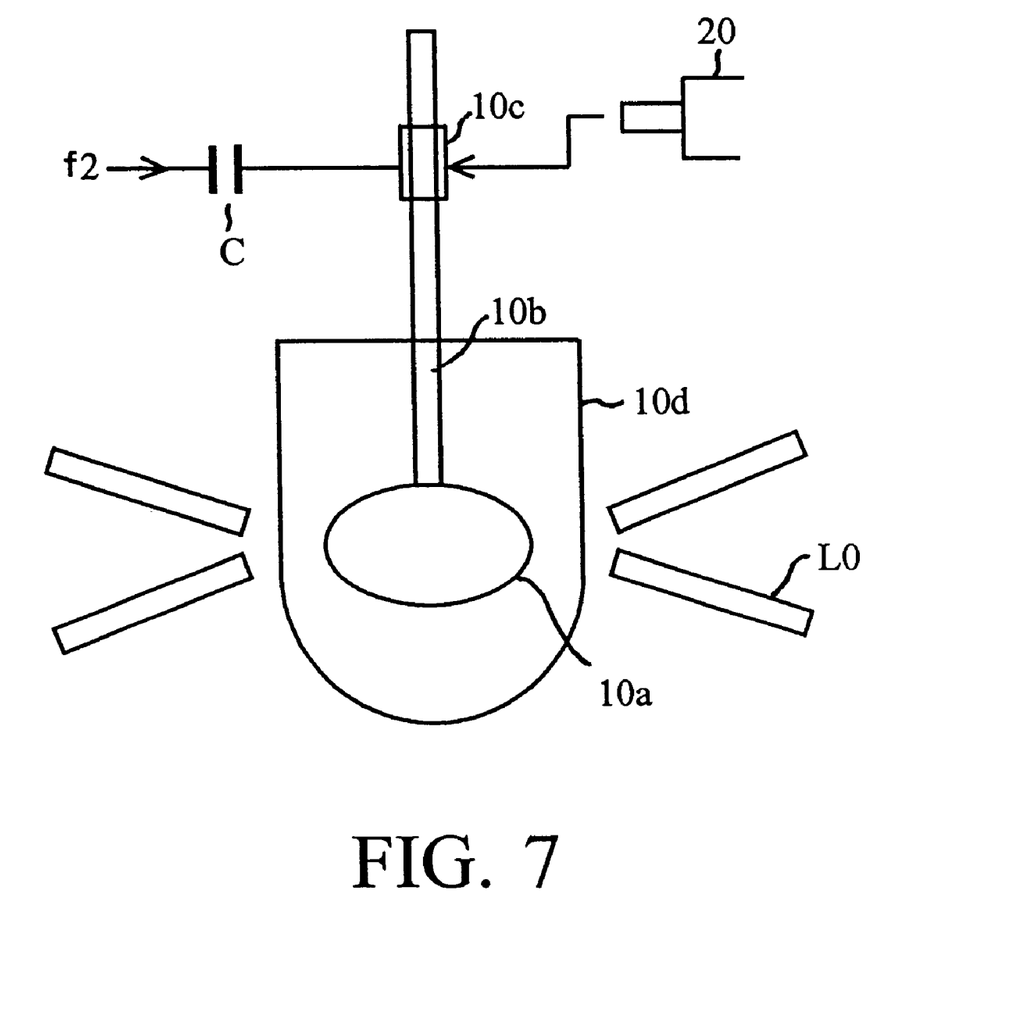
FIG. 7 is a diagram showing the construction of a lamp in another test example.

FIG. 7 shows an another test sample. In this construction, the excitation coil L0 is wound round an external tube 10d containing the luminescent tube 10a in its inside. The excitation coil L0 is in the same construction as the excitation coil disclosed in, for instance, Japanese Utility Model Disclosure No. 043330. That is, the sectional shape of wire rods comprising the excitation coil L0 is made flat and the wires are so arranged that the flat surfaces face each other. As the excitation coil L0 is arranged in the flat shape, the shading amount of the light radiated from the luminescent tube 10a can be reduced. The slender auxiliary tube 10b is provided to the luminescent tube 10a and the external electrode 10c is provided at almost the center position of the auxiliary tube 10b.

Figure 8:
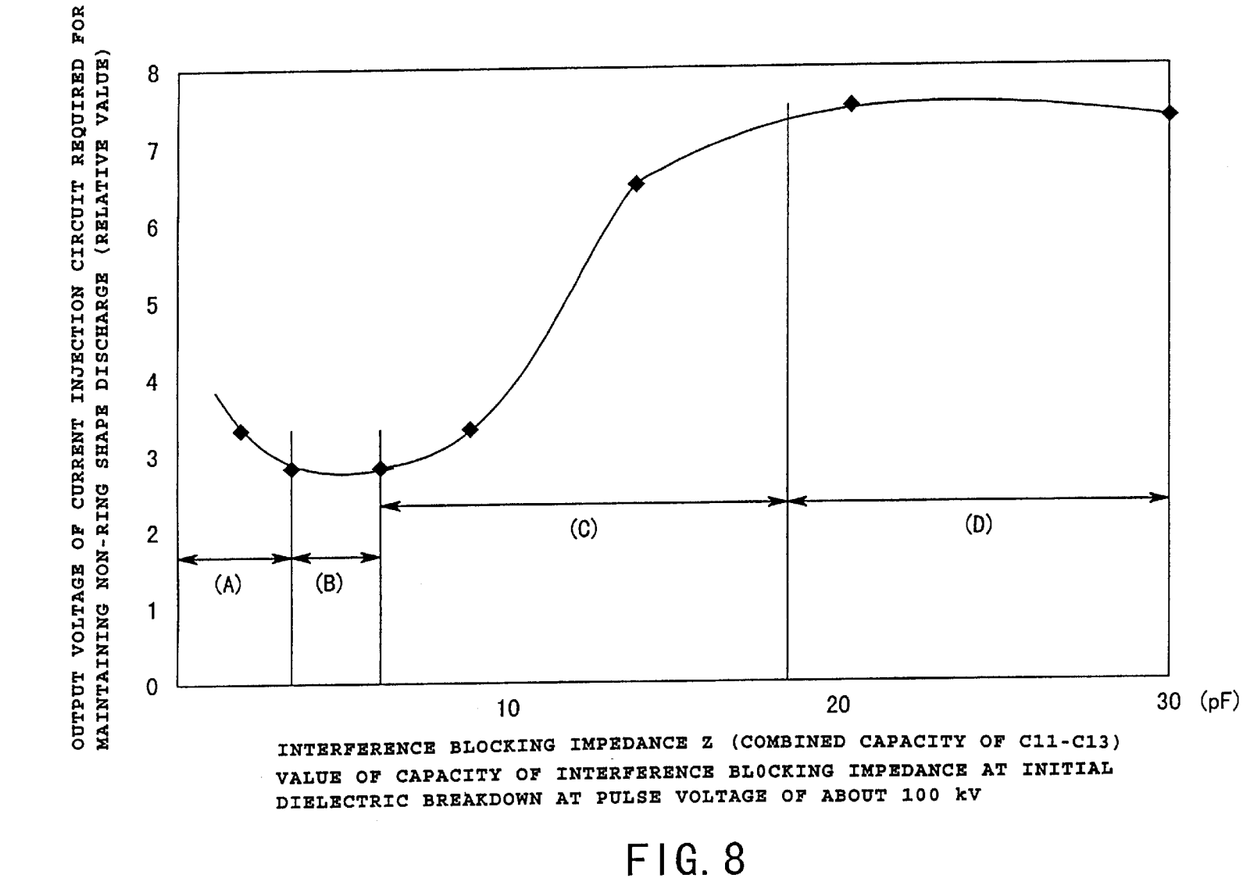
FIG. 8 is a graph showing test results when interference blocking impedance values are changed in the lamp structure shown in FIG. 7.

FIG. 8 shows the measured result of voltage (a relative voltage value) generated at the current injection circuit 12 side (the shown frequency f2 side) that is able to maintain the glow even when the capacitor C, that is the interference blocking impedance Z(f2) was changed within the range of 3–30 pF, the external electrode 10c was dielectric broken by applying pulse voltage using an igniter 20, and the application of pulse voltage by the igniter 20 was suspended. However, when the dielectric breakdown could not made, both frequencies were applied from the first to make the dielectric breakdown and the generated voltage at the current injection circuit 12 side that is able to maintain the glow was measured. Further, the frequency f0 of the excitation coil L0 was set at 13.56 MHz. As clearly seen from the figure, voltage required for maintaining the glow was most low in the range of C=5 pF and the range of its 0.3–2 times ((B) in the figure) is considered to be the proper range. With the increase of C from this range ((C), (D) in the figure), large glow maintaining voltage was required.

Figure 9:
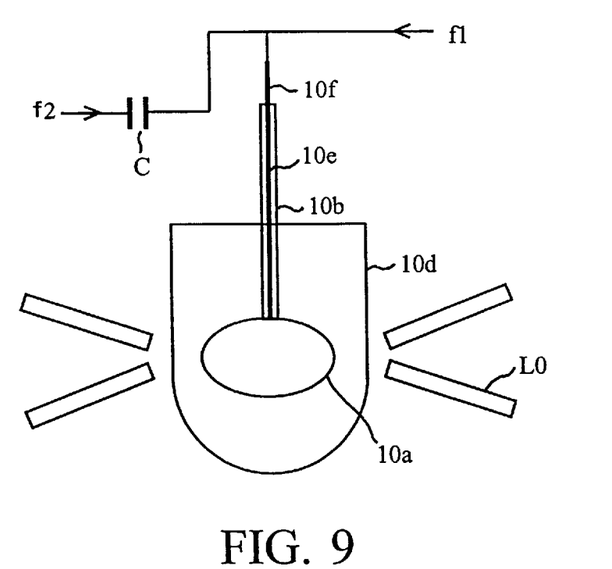
FIG. 9 is a diagram showing another lamp construction to which the present invention is applicable.

By the way, in the above embodiment, it was so constructed that high-tension voltage of the current injection circuit 12 and the high-tension pulse generating circuit 13 are applied to the external electrode 10c of the auxiliary tube 10b as shown in FIG. 1 and FIG. 7. However, instead of providing the auxiliary tube 10b and the external electrode 10c, it may be so constructed as to provide the end of the electric starting conductor 10e the outer wall of the luminescent tube 10a and supply high-tension power of the current injection circuit 12 and the high-tension pulse generating circuit 13 to the other end of the electric starting conductor 10e via an external electrode 10f as shown in FIG. 9.

Figure 10:
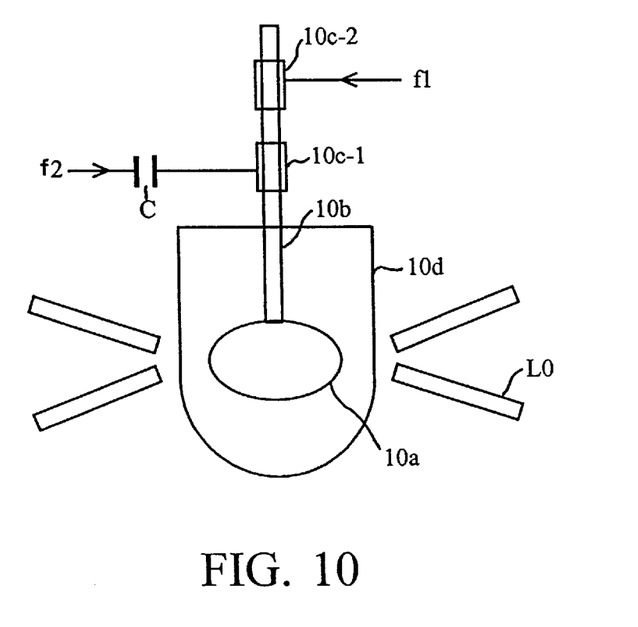
FIG. 10 is a diagram showing another lamp construction to which the present invention is applicable.

Further, the high-tension voltage of the current injection circuit 12 is applied to an external electrode 10c-1 located near the luminescent tube 10a in the longitudinal auxiliary tube 10b as shown in FIG. 10. And the circuit may be so constructed that high-tension voltage of the high-tension pulse generating circuit 13 is applied to an external electrode 10c-2 located far away from the luminescent tube 10a. In this case, as there is the auxiliary tube 10b between the high-tension pulse generating circuit 13 and the interference blocking impedance Z(f2), the withstanding voltage of the interference blocking impedance Z(f2) can be reduced.

As described in the above, pulse voltage of a peak value that is able to dielectric break the discharge space in the luminescent tube, is applied to the end of the auxiliary tube and voltage that is able to maintain a non-ring shaped discharge formed in the luminescent tube even when supply of pulse voltage is suspended. As a result, the discharge space in the auxiliary tube is dielectric broken by pulse voltage and accordingly, it becomes possible to improve the starting ability.

Further, according to the present invention, pulse voltage of a peak value that is able to dielectric break the discharge space in the luminescent tube is applied to the auxiliary tube at its position relatively close to the luminescent tube and also, voltage that is able to maintain the non-ling shaped discharge formed in the luminescent tube is applied to said auxiliary tube at its position relatively far away from the luminescent tube. As a result, the discharge space in the auxiliary tube is dielectric broken and accordingly, it becomes possible to improve the starting ability.

Furthermore, according to the present invention, the high-tension apply means and the current injection means are connected via the interference blocking impedance and also, a space between the interference blocking impedance and the high-tension apply means is connected to the end of the auxiliary tube or the other end of said conductor. As a result, it is possible to apply pulse voltage surely to the end of the auxiliary tube or the other end of the conductor without being affected by the current injection means and improve the starting ability, accordingly.

In addition, according to the present invention, when assuming that frequency and impedance at the high-tension apply mean are f1 and Z(f1) and frequency and impedance at the interference blocking side are f2 and Z(f2), respectively, $$f1<f2 \text{ and } Z(f1)>Z(f2)$$

Therefore, it is possible to apply pulse voltage surely to the end of he auxiliary tube or the other end of the conductor without being affected by the current injection means and improve the starting ability, accordingly.

What is claimed is:

1. An electrodeless discharge lamp unit comprising:
   an electrodeless discharge lamp provided with a luminescent tube with an excitation coil wound round it and an auxiliary tube;
   high-tension applying means for applying pulse voltage of a peak value that is able to dielectric break the discharge space in the luminescent tube to the end of the auxiliary tube; and
   current injection means for applying voltage, that is able to maintain the non-ring shaped discharge formed in the luminescent tube by applying pulse voltage by the high-tension applying means even when the application of pulse voltage is suspended, to the end of the auxiliary tube.

2. An electrodeless discharge lamp unit according to claim 1, wherein the high-tension applying means and the current injection means are connected via an interference blocking impedance and also, the connecting point of the interference blocking impedance with the high-tension applying means is connected to the end of the auxiliary tube.

3. An electrodeless discharge lamp unit according to claim 2, wherein when assuming that the hihg-tension applying means side frequency and impedance are f1 and Z(f1) and the interference blocking impedance side frequency and impedance are f2 and Z(f2), $$f1<f2 \text{ and } Z(f1)>Z(f2).$$

4. An electrodeless discharge lamp unit according to claim 3, wherein the interference blocking impedance is capacitance that is able to make dielectric breakdown by voltage of the frequency f1 voltage and is 0.3–2 times of capacitive impedance that is able to maintain the non-ring shaped discharge in said luminescent tube by the frequency f2 side voltage.

5. An electrodeless discharge lamp unit comprising:
   an electrodeless discharge lamp having a luminescent tube with an excitation coil wound round;
   a conductor of which one end is kept contact with the tube wall of the luminescent tube;
   high-tension applying means for applying pulse voltage of a peak value that is able to dielectric break the discharge space in the luminescent tube; and
   current injection means for applying voltage, that is able to maintain the non-ring shaped discharge formed in the luminescent tube by applying pulse voltage by the high-tension applying means even when application of the pulse voltage is suspended, to the other end of the conductor.

6. An electrodeless discharge lamp unit according to claim 5, wherein the high-tension applying means and the current injection means are connected each other via an interference blocking impedance and also, the connecting point between the interference blocking impedance and the high-tension applying means is connected to the other end of the conductor.

7. An electrodeless lamp unit according to claim 6, wherein when assuming that frequency and impedance at the high-tension applying side are f1 and Z(f1) and frequency and impedance at the interference blocking impedance side are f2 and Z(f2), respectively, $$f1<f2 \text{ and } Z(f1)>Z(f2).$$

8. An electrodeless discharge lamp unit according to claim 7, wherein the interference blocking impedance is capacitance that is able to make dielectric breakdown by the voltage of frequency f1 and is about 0.3–2 times of the capacitive impedance that is able to maintain the non-ring shaped discharge in the luminescent tube by the frequency f2 side voltage.

9. An electrodeless discharge lamp unit comprising:
   an electrodeless discharge lamp having a luminescent tube with an excitation coil wound round it and an auxiliary tube;
   high-tension applying means for applying pulse voltage of a peak value that is able to dielectric breakdown the discharge space in the luminescent tube to the auxiliary tube at a position relatively far away from the luminescent tube; and
   current injection means for applying voltage, that is able to maintain the non-ring shaped discharge formed in the luminescent tube by applying pulse voltage by the high-tension applying means even when the application of the pulse voltage is suspended, to the auxiliary tube at a position relatively close to the luminescent tube.

10. An electrodeless discharge lamp unit according to claim 9, wherein the high-tension applying means and the current injection means are connected via an interference blocking impedance and also, the connecting point between the interference blocking impedance and the high-tension applying means is connected to the end of the auxiliary tube.

11. An electrodeless discharge lamp unit according to claim 10, wherein when assuming that the high-tension applying means side frequency and impedance are f1 and Z(f1) and the interference blocking impedance side frequency and impedance are f2 and z(f2), $$f1<f2 \text{ and } Z(f1)>Z(f2).$$

12. An electrodeless discharge lamp unit according to claim 11, wherein the interference blocking impedance is capacitance that is able to dielectric breakdown by the voltage of frequency f1 and is 0.3–2 times of capacitive impedance that is able to maintain the non-ring shaped discharge in the luminescent tube by the frequency f2 side voltage.

13. An electrodeless discharge lamp unit comprising:

an electrodeless discharge lamp having an airtight luminescent tube and an auxiliary tune;

an excitation coil wound round the luminescent tube;

a source of high-frequency current to supply high-frequency current to the excitation coil; and high-tension applying means for applying pulse voltage that is able to dielectric break the discharge space in the luminescent tube via the auxiliary tube without supplying high-tension current from the source of high-frequency current to the excitation coil to the auxiliary tube.

14. An electrodeless discharge lamp unit according to claim 13, wherein the high-tension applying means and the source of high-frequency current are connected via an interference blocking impedance and the connecting point between the interference blocking impedance and the high-tension applying means is connected to the end of the auxiliary tube.

15. An electrodeless discharge lamp unit according claim 14 wherein when assuming that the high-tension applying means side frequency and impedance are f1 and Z(f1) and the interference blocking impedance side frequency and impedance are f2 and z(f2), $$f1 < f2 \text{ and } Z(f1) > Z(f2).$$

16. An electrodeless discharge lamp unit according to claim 15, wherein the interference blocking impedance is the capacitance that is able to dielectric breakdown by the voltage of frequency f1 and is 0.3–2 times of capacitive impedance that is able to maintain the non-ring shaped discharge in the luminescent tube by the frequency f2 side voltage.

* * * * *